US012348891B2

(12) United States Patent
Fujita et al.

(10) Patent No.: US 12,348,891 B2
(45) Date of Patent: Jul. 1, 2025

(54) RADIATION IMAGING APPARATUS AND RADIATION IMAGING SYSTEM

(71) Applicant: CANON KABUSHIKI KAISHA, Tokyo (JP)

(72) Inventors: Shuichi Fujita, Kanagawa (JP); Hideyuki Okada, Saitama (JP); Kentaro Fujiyoshi, Irvine, CA (US); Yoshiaki Serizawa, Kanagawa (JP); Ryunosuke Bannai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 387 days.

(21) Appl. No.: 18/153,844

(22) Filed: Jan. 12, 2023

(65) Prior Publication Data

US 2023/0247170 A1 Aug. 3, 2023

(30) Foreign Application Priority Data

Jan. 31, 2022 (JP) ................................. 2022-013578

(51) Int. Cl.
*H04N 5/32* (2023.01)
*H04N 25/75* (2023.01)

(52) U.S. Cl.
CPC ............. *H04N 5/32* (2013.01); *H04N 25/75* (2023.01)

(58) Field of Classification Search
None
See application file for complete search history.

(56) References Cited

U.S. PATENT DOCUMENTS

| 3,634,849 | A  | * | 1/1972  | Nishizawa | ............ | G01T 1/2928 |
|           |    |   |         |           |              | 250/214 R   |
| 7,514,690 | B2 | * | 4/2009  | Endo      | ............... | H04N 25/78 |
|           |    |   |         |           |              | 348/308     |
| 8,878,972 | B2 |   | 11/2014 | Wayama    |              |             |
| 9,048,154 | B2 |   | 6/2015  | Takenaka  |              |             |
| 9,128,196 | B2 |   | 9/2015  | Sato      |              |             |
| 9,134,432 | B2 |   | 9/2015  | Iwashita  |              |             |
| 9,234,966 | B2 |   | 1/2016  | Sugawara  |              |             |
| 9,270,903 | B2 |   | 2/2016  | Wayama    |              |             |
| 9,277,896 | B2 |   | 3/2016  | Ofuji     |              |             |
| 9,341,723 | B2 | * | 5/2016  | Niekawa   | ............. | H04N 25/709 |

(Continued)

FOREIGN PATENT DOCUMENTS

JP 2010-268171 A 11/2010

*Primary Examiner* — David P Porta
*Assistant Examiner* — Djura Malevic
(74) *Attorney, Agent, or Firm* — VENABLE LLP

(57) ABSTRACT

A radiation imaging apparatus comprising pixels, a driver controlling the pixels via drive lines and a controller, is provided. The driver comprises terminals and performs a shift operation of sequentially outputting an activation signal from each of the terminals in response to first and second signals supplied from the controller. The terminals include a first group that is connected to the drive lines and a second group that is not connected to the drive lines. The first group includes a first terminal output the activation signal first and a second terminal output the activation signal at last. During detecting a start of irradiation, the driver outputs the activation signal from the second terminal in the shift operation according to the first signal and then outputs the activation signal from the first terminal in the shift operation according to the second signal.

12 Claims, 15 Drawing Sheets

(56) References Cited

U.S. PATENT DOCUMENTS

| | | |
|---|---|---|
| 9,423,512 B2 | 8/2016 | Sato |
| 9,423,513 B2 | 8/2016 | Watanabe |
| 9,445,030 B2 | 9/2016 | Yagi |
| 9,462,989 B2 | 10/2016 | Takenaka |
| 9,468,414 B2 | 10/2016 | Ryu |
| 9,470,800 B2 | 10/2016 | Iwashita |
| 9,470,802 B2 | 10/2016 | Okada |
| 9,521,347 B2 | 12/2016 | Kawanabe |
| 9,541,653 B2 | 1/2017 | Iwashita |
| 9,625,585 B1 | 4/2017 | Yokoyama |
| 9,655,586 B2 | 5/2017 | Yagi |
| 9,661,240 B2 | 5/2017 | Fujioshi |
| 9,675,307 B2 | 6/2017 | Ofuji |
| 9,726,767 B2 | 8/2017 | Kawanabe |
| 9,737,271 B2 | 8/2017 | Iwashita |
| 9,812,474 B2 | 11/2017 | Yagi |
| 9,835,732 B2 | 12/2017 | Fujiyoshi |
| 9,838,638 B2 | 12/2017 | Furumoto |
| 9,885,790 B2 | 2/2018 | Okada |
| 9,948,871 B2 | 4/2018 | Wayama |
| 9,971,046 B2 | 5/2018 | Ryu |
| 9,977,135 B2 | 5/2018 | Yokoyama |
| 9,980,685 B2 | 5/2018 | Iwashita |
| 9,989,656 B2 | 6/2018 | Sato |
| 10,068,943 B2 | 9/2018 | Fujiyoshi |
| 10,349,914 B2 | 7/2019 | Takenaka |
| 10,352,765 B2 | 7/2019 | Okada |
| 10,416,323 B2 | 9/2019 | Ryu |
| 10,473,801 B2 | 11/2019 | Kawanabe |
| 10,537,295 B2 | 1/2020 | Watanabe |
| 10,551,721 B2 | 2/2020 | Sato |
| 10,634,800 B2 | 4/2020 | Yokoyama |
| 10,716,522 B2 | 7/2020 | Sato |
| 10,914,849 B2 | 2/2021 | Ofuji |
| 10,973,490 B2 * | 4/2021 | Kawana ................ A61B 6/545 |
| 10,992,883 B2 | 4/2021 | Kameshima |
| 11,067,706 B2 | 7/2021 | Furumoto |
| 11,083,430 B2 | 8/2021 | Sato |
| 11,090,018 B2 | 8/2021 | Watanabe |
| 11,154,261 B2 | 10/2021 | Okada |
| 11,157,059 B2 * | 10/2021 | Yokoyama .............. G01T 1/175 |
| 11,243,314 B2 | 2/2022 | Fujiyoshi |
| 11,280,919 B2 | 3/2022 | Takenaka |
| 11,294,078 B2 | 4/2022 | Miura |
| 11,402,518 B2 | 8/2022 | Ryu |
| 11,487,027 B2 * | 11/2022 | Watanabe ................ G01T 1/17 |
| 2013/0015327 A1 * | 1/2013 | Amitani ................ H04N 25/76<br>250/208.1 |
| 2013/0068961 A1 * | 3/2013 | Tajima ................... H04N 25/30<br>250/394 |
| 2013/0264489 A1 * | 10/2013 | Yagi ......................... G01T 1/17<br>250/394 |
| 2013/0322597 A1 * | 12/2013 | Uchiyama .............. H04N 23/30<br>250/394 |
| 2015/0076358 A1 * | 3/2015 | Okada .................... H04N 25/42<br>250/370.08 |
| 2019/0146103 A1 * | 5/2019 | Ofuji ...................... H04N 23/30<br>250/370.08 |
| 2020/0129138 A1 * | 4/2020 | Iwakiri .................. A61B 6/542 |
| 2020/0145591 A1 * | 5/2020 | Iwakiri .................. G01T 1/247 |
| 2022/0075085 A1 | 3/2022 | Kawanabe |
| 2022/0196859 A1 * | 6/2022 | Fujiyoshi .............. H04N 23/30 |
| 2022/0317319 A1 | 10/2022 | Ryu |
| 2022/0334272 A1 | 10/2022 | Okada |
| 2022/0344900 A1 * | 10/2022 | Kondo .................. H01S 5/0425 |
| 2022/0344901 A1 * | 10/2022 | Kondo .................. H01S 5/0428 |
| 2022/0344908 A1 * | 10/2022 | Kondo .................. G01S 17/894 |
| 2022/0401054 A1 * | 12/2022 | Taya .................... A61B 6/4035 |
| 2023/0247170 A1 * | 8/2023 | Fujita .................... H04N 25/75<br>250/370.08 |
| 2023/0258828 A1 * | 8/2023 | Bannai .................. G01T 1/2002<br>250/366 |

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

In medical image diagnosis or nondestructive inspection, a radiation imaging apparatus using a Flat Panel Detector (FPD) made of a semiconductor material has been put into practical use. Japanese Patent Laid-Open No. 2010-268171 discloses a radiation imaging apparatus that performs reset processing of repetitively reading out signals from a plurality of radiation detection elements while sequentially switching a scanning line to which an ON voltage is to be applied, thereby detecting the start of radiation irradiation.

SUMMARY OF THE INVENTION

In a scanning circuit that sequentially outputs signals for activating scanning lines from a plurality of output terminals, the number of output terminals needs to be equal to or larger than the total number of scanning lines. On the other hand, for example, if a general-purpose article is used as the scanning circuit, the number of output terminals of the scanning circuit is sometimes larger than the number of scanning lines. In a case where the number of output terminals is larger than the number of scanning lines, when detecting the start of radiation irradiation, no signal is read out from any radiation detection element while the signal for activating a scanning line is being output from an output terminal that is not connected to the scanning line. If radiation irradiation is started while the signal for activating a scanning line is being output from an output terminal that is not connected to the scanning line, signals from the radiation detection elements cannot be obtained, and detection of the start of radiation irradiation may be delayed.

Several embodiments of the present invention provide a technique advantageous in detecting the start of radiation irradiation.

According to some embodiments, a radiation imaging apparatus comprising: a plurality of pixels arranged to form a plurality of rows and a plurality of columns; a drive circuit configured to control the plurality of pixels via a plurality of drive lines arranged to extend in a row direction; a detection circuit configured to detect a start of radiation irradiation in accordance with signals output from the plurality of pixels; and a drive controller, wherein the drive circuit comprises a plurality of terminals, and is configured to perform a shift operation of sequentially outputting an activation signal from each of the plurality of terminals one by one in accordance with a shift clock in response to each of a plurality of start signals including a first start signal and a second start signal, which are supplied from the drive controller, the plurality of terminals include a first terminal group that is connected to the plurality of drive lines and is configured to continuously output the activation signal for activating the plurality of drive lines, and a second terminal group that is not connected to the plurality of drive lines, the first terminal group includes a first terminal configured to output the activation signal first in the first terminal group and a second terminal configured to output the activation signal at last in the shift operation, and during a period until the detection circuit detects the start of radiation irradiation, the drive controller is configured to supply the second start signal to the drive circuit before the shift operation according to the first start signal ends, and the drive circuit is configured to output the activation signal from the second terminal in the shift operation according to the first start signal and then outputs the activation signal from the first terminal in the shift operation according to the second start signal, is provided.

Further features of the present invention will become apparent from the following description of exemplary embodiments (with reference to the attached drawings).

DESCRIPTION OF THE EMBODIMENTS

Figure 1:
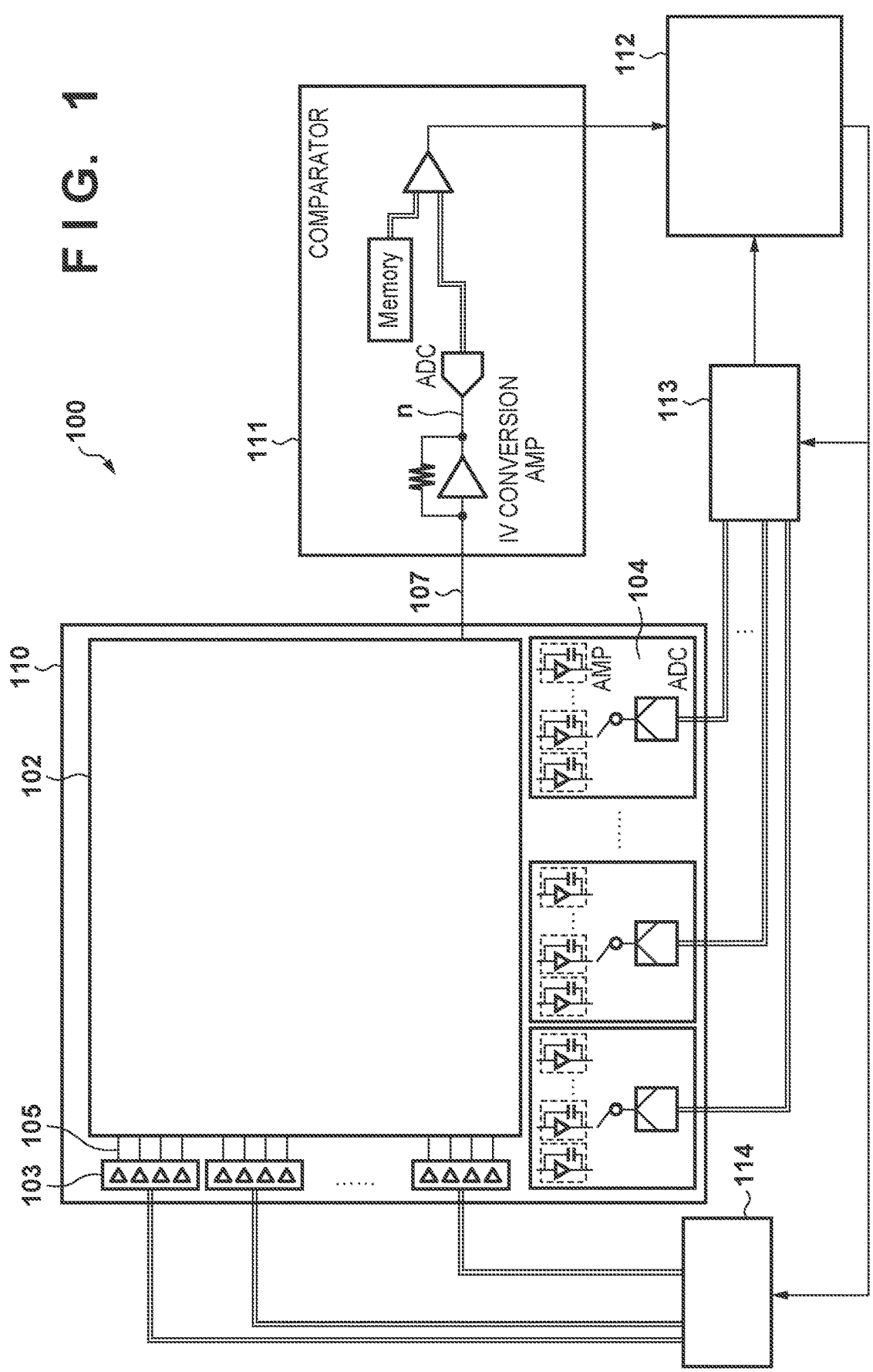
FIG. 1 is a view showing an example of the configuration of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation according to the present invention can include not only α-rays, β-rays, and γ-rays that are beams generated by particles (including photons) emitted by radioactive decay but also beams having equal or more energy, for example, X-rays, particle rays, and cosmic rays.

A radiation imaging apparatus according to the embodiment of the present disclosure and a radiation imaging system using the radiation imaging apparatus will be described with reference to FIGS. 1 to 15. FIG. 1 is a view showing an example of the configuration of a radiation imaging apparatus 100 according to this embodiment. As shown in FIG. 1, the radiation imaging apparatus 100 includes a pixel array 102 in which a plurality of pixels 101 (shown in FIG. 3) are arranged to form a plurality of rows and a plurality of columns, a drive circuit 103 that controls the plurality of pixels 101 via a plurality of drive lines 105 arranged to extend in the row direction (the horizontal direction in FIGS. 1 and 3), a detection circuit 111 configured to detect the start of radiation irradiation in accordance with signals output from the plurality of pixels 101, and a drive controller 114. Also, the radiation imaging apparatus 100 can include a readout circuit 104 that converts an electric charge accumulated in the pixels 101 into an electrical signal and reads it out in cooperation with the drive circuit 103, and an image input unit 113 configured to extract the electrical signal output from the readout circuit 104 as an image signal. Furthermore, the radiation imaging apparatus 100 can include a controller 112 configured to control each component in the radiation imaging apparatus 100.

Figure 2:
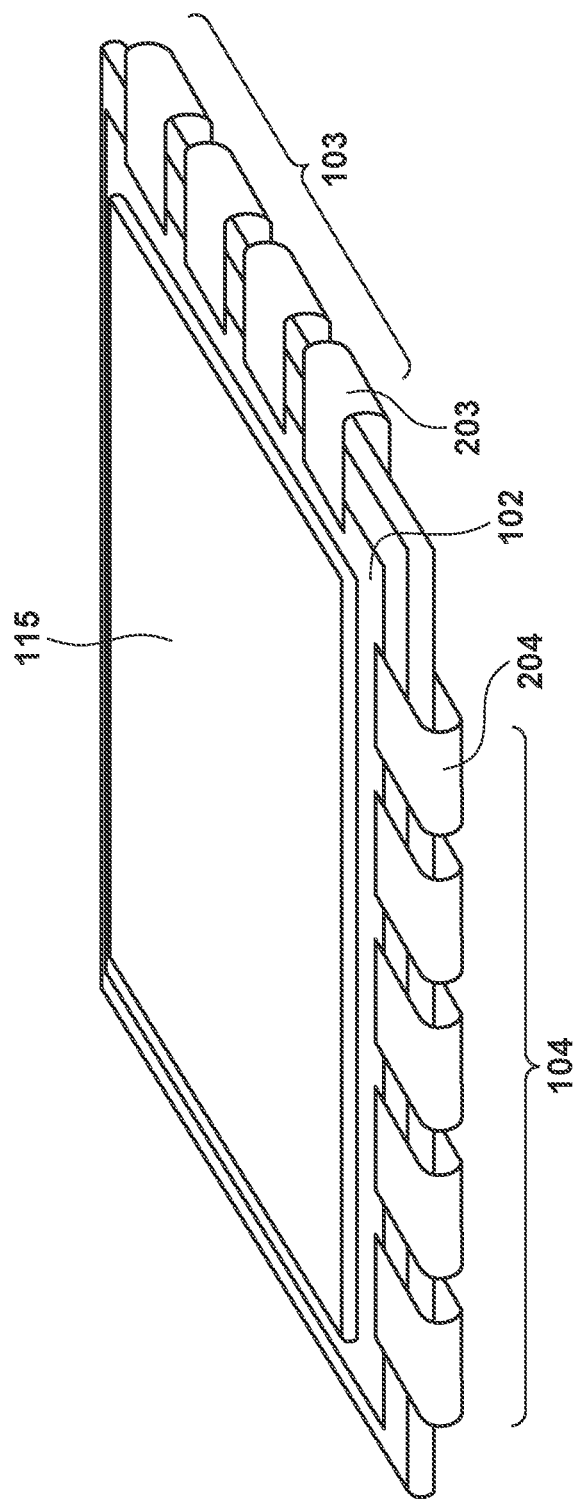
FIG. 2 is a view showing an example of the configuration of the detection unit of the radiation imaging apparatus shown in FIG. 1.

As shown in FIG. 2, the detection unit 110 can include a scintillator 115, a pixel array 102, a drive circuit 103, and a readout circuit 104. The scintillator 115 converts, for example, radiation such as X-rays into light detectable by the pixel 101. The pixel array 102 includes the plurality of pixels 101 arranged in a matrix, and converts light converted from radiation by the scintillator 115 into an electric charge. The drive circuit 103 selects the plurality of pixels 101 arranged in a matrix via the drive line 105 on a row basis. For example, as shown in FIG. 2, the drive circuit 103 may be formed by a plurality of driver ICs 203. The readout circuit 104 outputs an electrical signal according to an electric charge accumulated in the pixels 101 selected by the drive circuit 103. For example, as shown in FIG. 2, the readout circuit 104 may be formed by a plurality of readout ICs 204.

Figure 3:
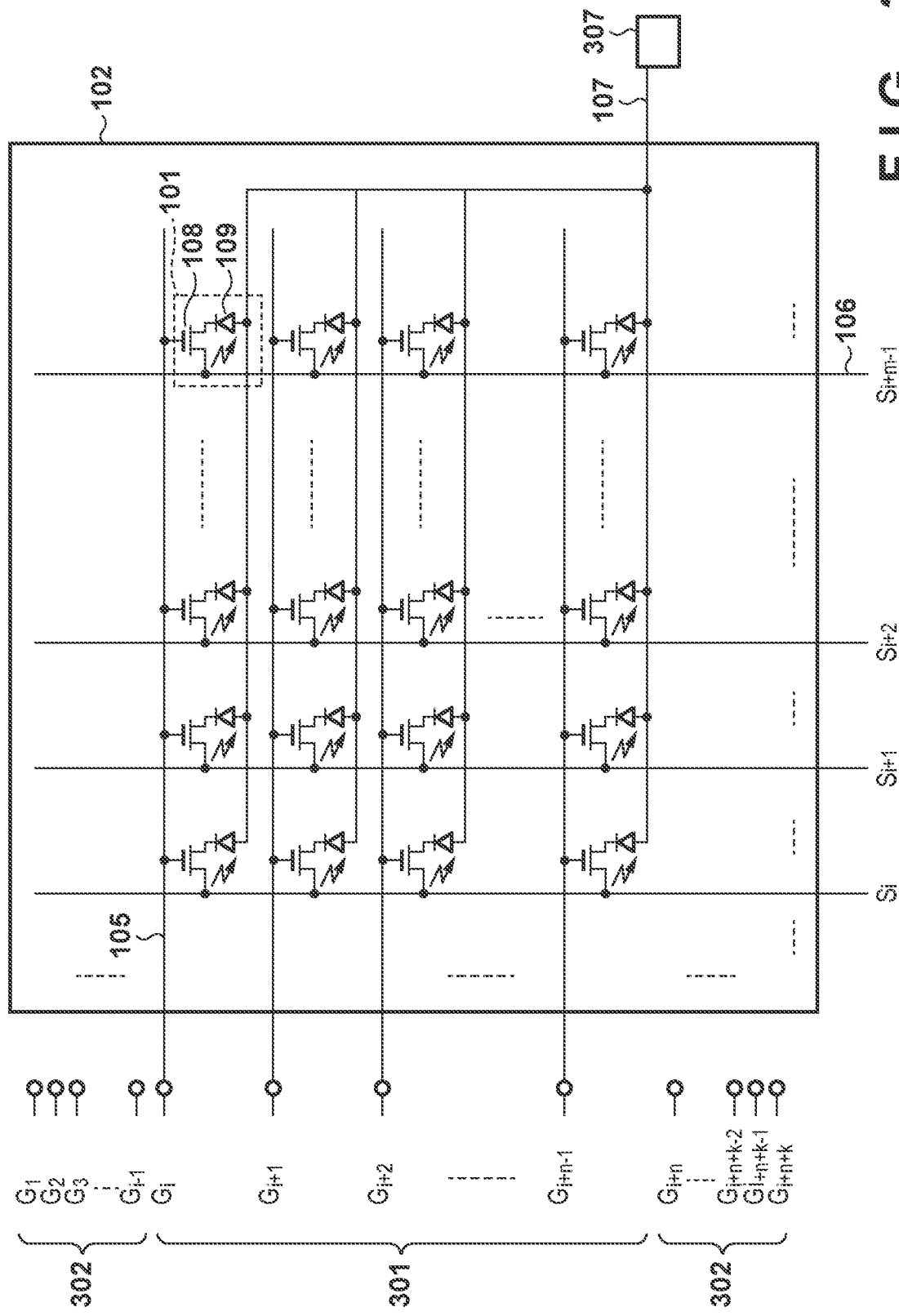
FIG. 3 is a view showing an example of the configuration of the pixel array of the radiation imaging apparatus shown in FIG. 1.

FIG. 3 shows an example of the configuration of the pixel array 102. As described above, the plurality of pixels 101 are arranged in the pixel array 102. Each pixel 101 includes a conversion element 109 configured to convert light that the scintillator 115 generates from radiation into an electric charge, and a switch element 108 configured to read out a signal according to the electric charge generated by the conversion element 109 to a corresponding signal line 106 of a plurality of signal lines 106 arranged to extend in the column direction (the vertical direction in FIG. 3). For the conversion element 109, for example, a photodiode or the like is used. For the switch element 108, for example, a Thin Film Transistor (TFT) or the like is used. When an activation signal for activating each of the plurality of drive lines 105 is output from the drive circuit 103, and the switch element 108 connected to the drive line to which the activation signal is input is turned on, a signal is read out from the pixel 101 to the signal line 106.

In this embodiment, an example in which a so-called indirect-type conversion element is arranged in the pixel array 102 such that radiation is converted by the scintillator 115 into light detectable by the conversion element 109 is shown. However, the present invention is not limited to this. A direct-type conversion element may be arranged in the pixel array 102 without arranging the scintillator 115 such that the conversion element 109 directly converts radiation into a charge signal.

In the pixel array 102, a bias line 107 configured to supply a bias voltage from a bias source 307 to the conversion element 109 is arranged. The bias source 307 can be arranged in the radiation imaging apparatus 100 together with the detection circuit 111. The detection circuit 111 detects the start of radiation irradiation in accordance with a current that flows to the bias line 107 as signals output from the plurality of pixels 101. More specifically, if radiation enters, a current flows to the conversion element 109, and an electric charge is accumulated. The bias line 107 is connected to the bias source 307 that supplies the electric charge. When the switch element 108 is turned on, the electric charge accumulated in the conversion element 109 is discharged to the signal line 106. Simultaneously, the electric charge is refilled from the bias source 307 connected to the bias line 107. At this time, a current flows. Hence, the start of radiation irradiation can be detected by detecting the change of the current flowing to the bias line 107 when the drive line 105 is activated, and the switch element 108 is turned on.

Figure 4:
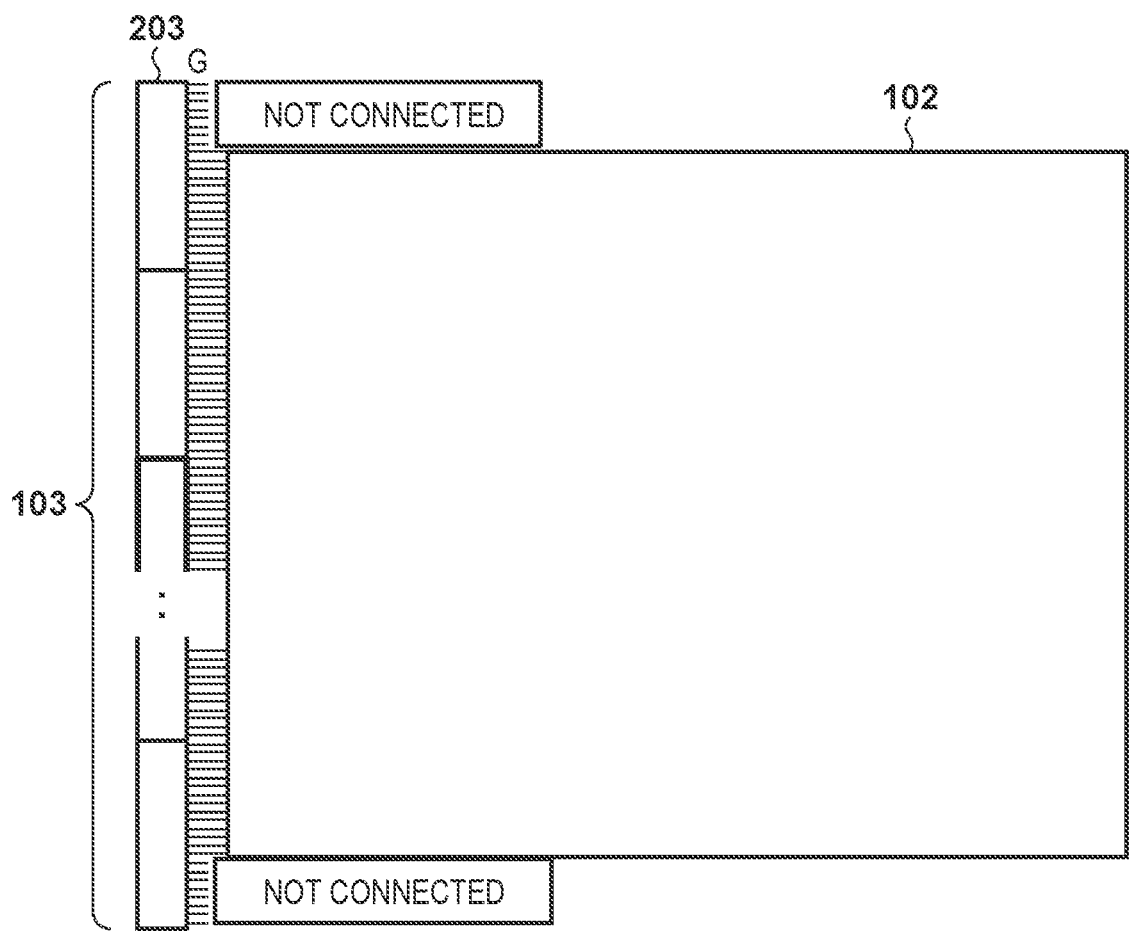
FIG. 4 is a view showing an example of connection between the drive circuit and the drive lines of the radiation imaging apparatus shown in FIG. 1.

FIGS. 3 and 4 show an example of connection between the drive circuit 103 and the drive lines 105. The drive circuit 103 includes a plurality of terminals G each configured to output an activation signal for activating a corresponding one of the plurality of drive lines 105. Also, the drive circuit 103, for example, includes a shift register, and performs a shift operation of sequentially outputting the activation signal from each of the plurality of terminals G one by one in accordance with a shift clock in response to each of a plurality of start signals supplied from the drive controller 114. In the drive circuit 103, a general-purpose article may be used for each of the driver ICs 203 that form the drive circuit 103. The total number of pixels in the pixel array 102 varies depending on the application purpose, and the number of drive lines 105 changes depending on the pixel array 102. In the drive circuit 103 that sequentially outputs the activation signal for activating the drive line 105, the number of terminals for outputting the activation signal needs to be equal to or larger than the total number of drive lines 105. On the other hand, if a general-purpose article is used for the driver IC 203, the number of terminals for outputting the activation signal, which are arranged in the drive circuit 103 formed by the plurality of driver ICs 203, is sometimes larger than the number of drive lines 105.

FIGS. 3 and 4 show a case where the number of terminals G arranged in the drive circuit 103 is larger than the number of drive lines 105 arranged in the pixel array 102. In this case, the plurality of terminals G arranged in the drive circuit 103 include a terminal group 301 in which the terminals are connected to the plurality of drive lines 105, respectively, and continuously output the activation signals for activating the plurality of drive lines 105, and a terminal group 302 in which the terminals are not connected to the plurality of drive lines 105. As shown in FIG. 3, in this embodiment, n terminals from a terminal $G_i$ to a terminal $G_{i+n-1}$ in the terminals G arranged in the drive circuit 103 form the terminal group 301 in which each terminal is connected to a corresponding drive line 105. In the terminals G arranged in the drive circuit 103, i terminals from a terminal $G_1$ to a terminal $G_{i-1}$ and (k+1) terminals from a terminal $G_{i+n}$ to a terminal $G_{i+n+k}$ form the terminal groups 302 that are not connected to the drive lines 105.

Since the drive circuit 103 includes, for example, a shift register and sequentially selects the terminal to output the activation signal, even the terminals G included in the terminal group 302 that is not connected to the drive lines 105 sequentially output the activation signal. While the terminals G included in the terminal group 302 are sequentially outputting the activation signal, no current flows to the bias line 107. That is, if radiation irradiation is started while the terminals G included in the terminal group 302 are sequentially outputting the activation signal, signals from the pixels 101 cannot be obtained, and detection of the start of radiation irradiation may be delayed. For example, assume that the number of drive lines 105 is about 3,000, and the number of terminals included in the terminal groups 302 that are not connected to the drive lines 105 is about 30. In this case, it may be impossible to detect the start of radiation irradiation for about 1% of the scanning time of one image in the pixel array 102. If the drive time of one drive line 105 (for example, the time to output the activation signal to one drive line 105) is 30 μs, a time of about 1 ms is a dead time (dead period) during which radiation detection is not performed. Depending on the size of the pixel 101 and the size of the pixel array 102, the number of terminals included in the terminal groups 302 may be about 100, and a dead time of 3 ms to 4 ms may be generated.

Figure 5:
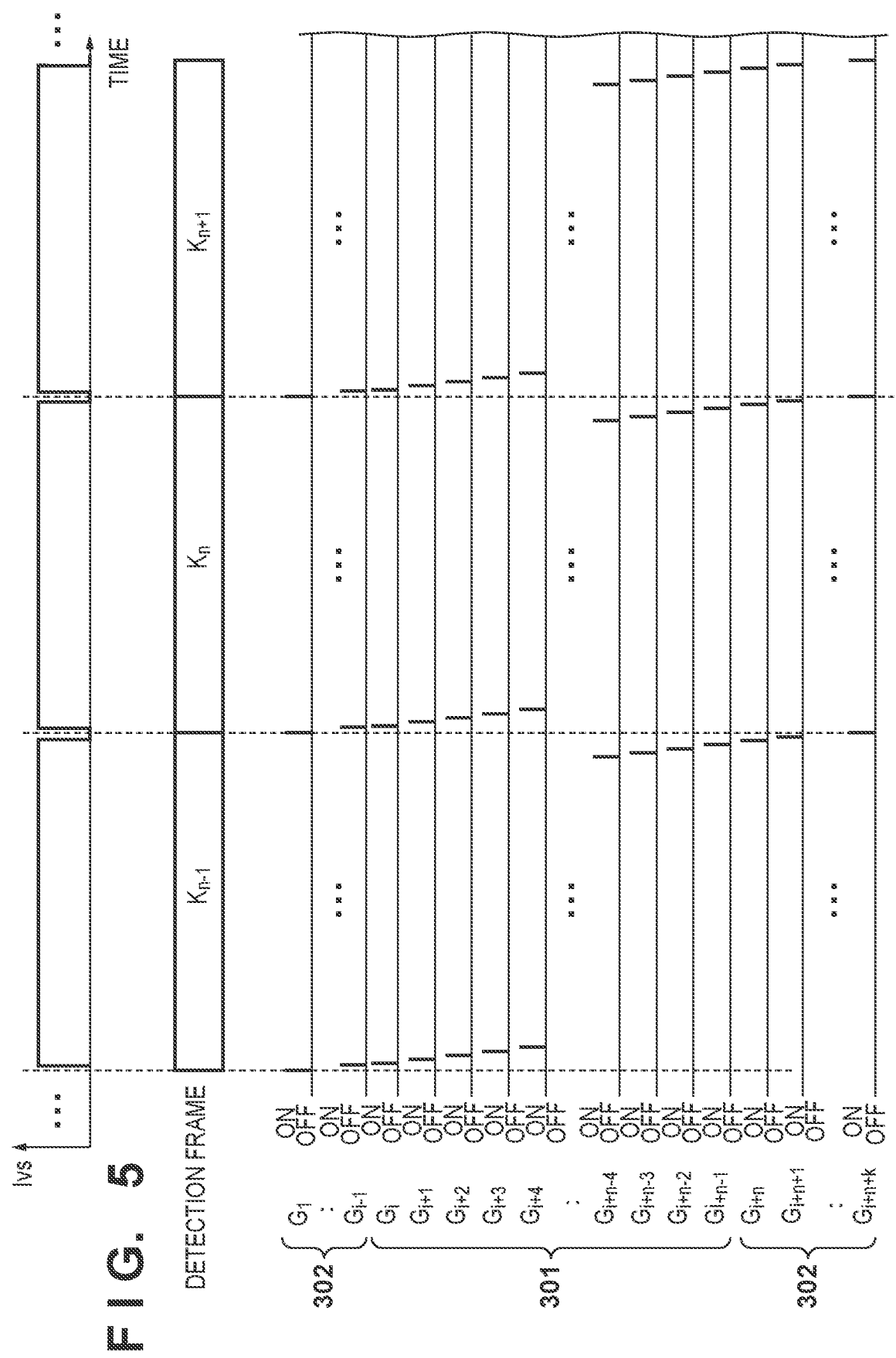
FIG. 5 is a timing chart showing an example of drive of a radiation imaging apparatus according to a comparative example.
Figure 6:
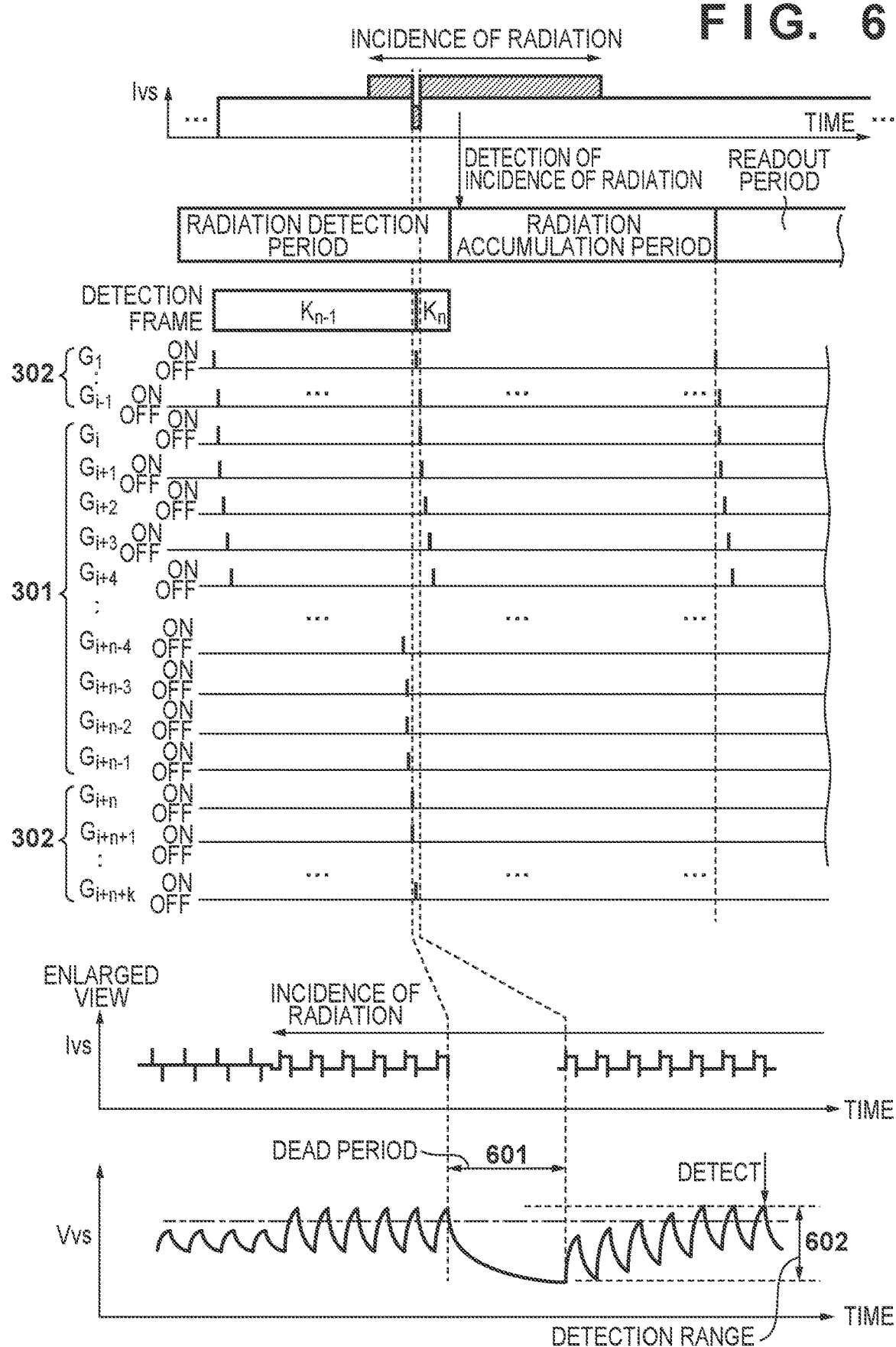
FIG. 6 is a timing chart showing an operation of detecting the start of radiation irradiation in the radiation imaging apparatus according to the comparative example.

The above-described problem in the operation of a comparative example in which the terminals $G_1$ to $G_{i+n+k}$ arranged in the drive circuit 103 sequentially output the activation signal, and the terminal $G_1$ outputs the activation signal next to the terminal $G_{i+n+k}$ will be described in detail with reference to FIGS. 5 to 8. As shown in FIG. 5, when detecting the start of radiation irradiation in the radiation imaging apparatus 100, an operation of reading out a dark current component accumulated in the conversion elements 109 of the pixels 101 is repetitively performed. In this case, the drive circuit 103 sequentially outputs the activation signal from each terminal G, and the plurality of switch elements 108 connected to the corresponding drive lines 105 are turned on at once. At this time, the total value of currents or dark currents generated when the switch elements 108 of the pixels 101 are turned on flows to the bias line 107. FIGS. 5 and 6 show the control method of the comparative example and current waveforms in a case of incidence of radiation.

FIG. 5 shows the outline of drive of the drive lines 105 at the time of radiation detection and a bias current Ivs that flows to the bias line 107 at that time. During "ON" of each terminal G, the activation signal is input to the drive line 105 corresponding to the respective terminal G. FIG. 6 shows detailed temporal changes of the bias current Ivs before and after incidence of radiation and a voltage Vvs after the bias current Ivs is converted into a voltage. The voltage Vvs can be the voltage of a node n between a current/voltage (IV) conversion AMP and an analog/digital converter (ADC) in the detection circuit 111 shown in FIG. 1.

As described above, the terminals $G_1$ to $G_{i+n+k}$ of the drive circuit 103 output the activation signal regardless of the presence/absence of connection between the pixel array 102 and the drive lines 105. At this time, while the terminals G included in the terminal groups 302 that are not connected to the drive lines 105 are outputting the activation signal, no current flows to the bias line 107. More specifically, as shown in the enlarged view of FIG. 6, the bias current Ivs has a waveform with a pulse shape in the up-and-down direction, which is generated by injection currents that flow when the switch element 108 transitions between the ON operation and the OFF operation in accordance with the activation signal. If incidence of radiation is absent, the bias current Ivs flowing between the injection currents in the up-and-down direction has a predetermined value. If radiation enters, the bias current Ivs changes in the upward direction of FIG. 6 in accordance with the amount of incidence. Hereinafter, the change of the bias current Ivs indicates the change of the current flowing between the pulse-shaped injection currents.

Also, to detect the change of the current amount on the bias line 107, current/voltage conversion needs to be performed. At this time, since impulse-shaped noise may be added due to the influence of external noise or vibrations, the IV conversion AMP of the detection circuit 111 may also have the function of an LPF configured to remove noise. For this reason, the waveform of the voltage Vvs obtained when current/voltage conversion is performed is a waveform with rounded leading and trailing edges, as shown in FIG. 6. At this time, as shown in FIG. 6, the time constant is changed between the rising direction and the falling direction. The time constant may be made short in the rising direction and long in the falling direction, and the waveform may be maintained such that incidence of radiation can quickly be detected, and detection omission hardly occurs. Hence, a waveform that quickly rises and slowly falls is input to the ADC of the detection circuit 111, as shown in FIG. 6.

As described above, the period in which the activation signal is output from the terminals G included in the terminal group 302 that is not connected to the drive lines 105 is a dead period 601 in which the bias current Ivs does not flow, and radiation cannot be detected. Hence, during the dead period 601, since the bias current Ivs does not flow, falling continues, and the voltage Vvs continuously lowers. For this reason, a detection range 602 of the voltage Vvs becomes large, and the input width of the ADC arranged in the detection circuit 111 at the subsequent stage needs to be made large.

Figure 7:
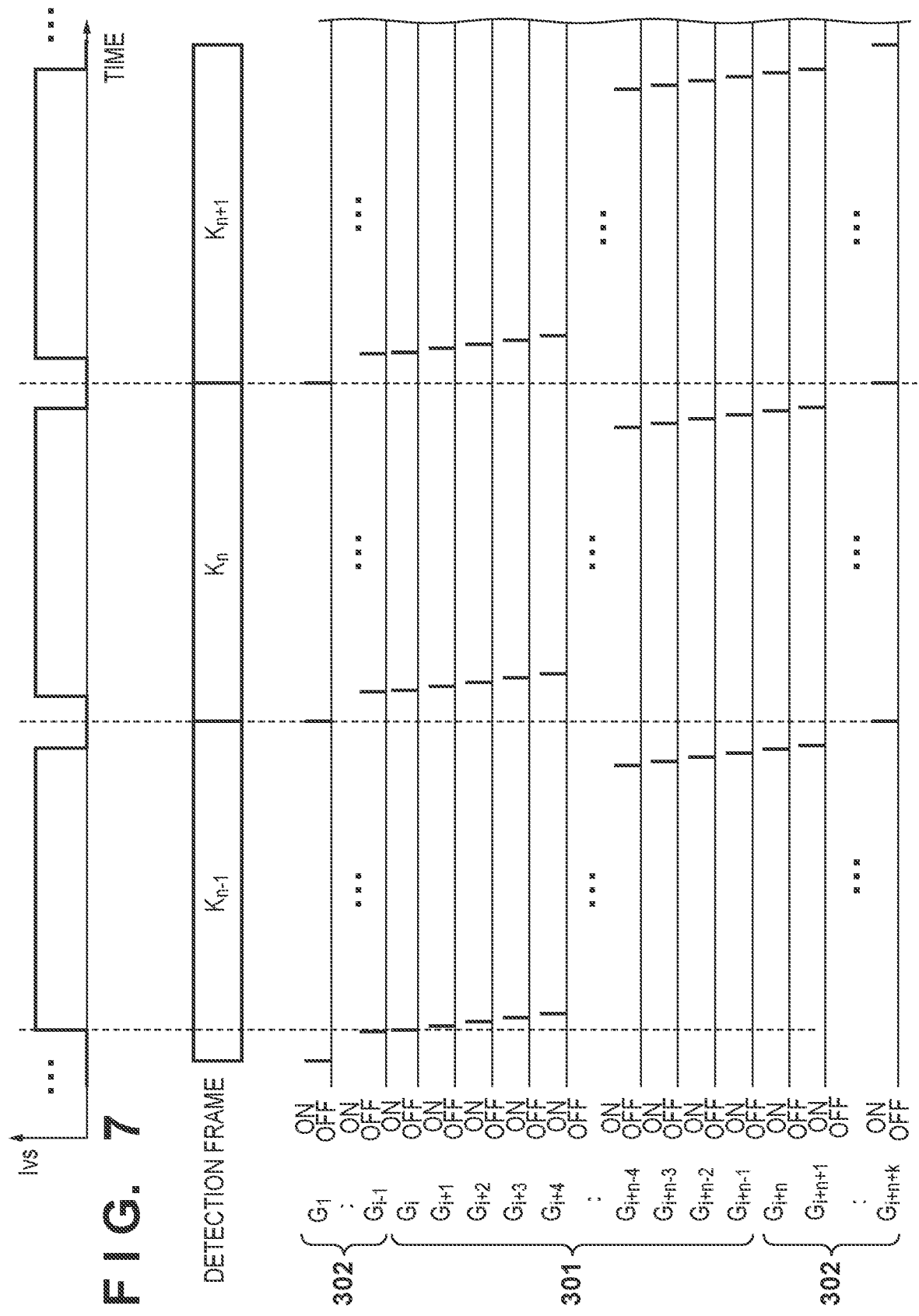
FIG. 7 is a timing chart showing a problem when detecting the start of radiation irradiation in the radiation imaging apparatus according to the comparative example.
Figure 8:
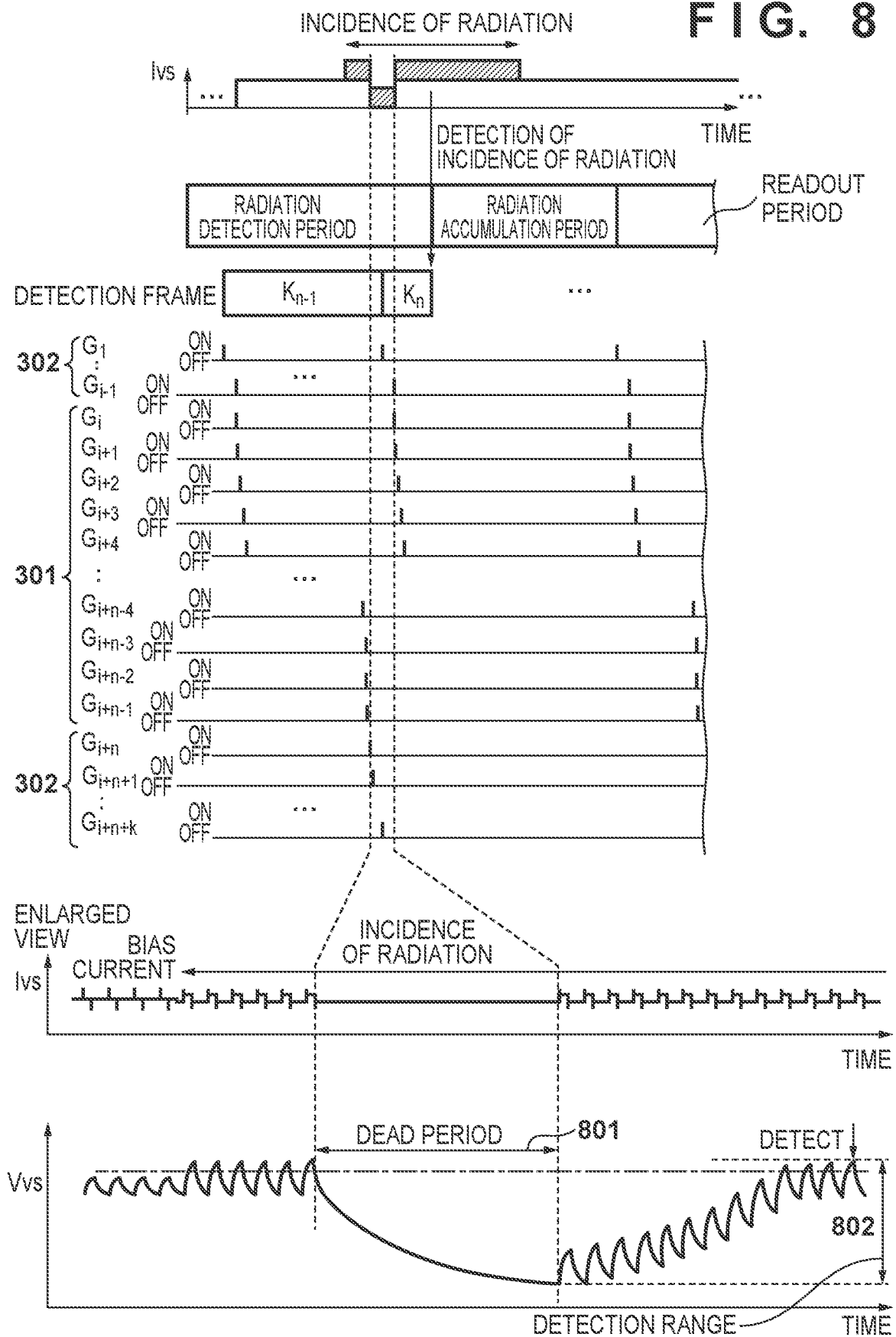
FIG. 8 is a timing chart showing a problem when detecting the start of radiation irradiation in the radiation imaging apparatus according to the comparative example.

FIGS. 7 and 8 show an example in which the above-described problem is more conspicuous. Depending on the specifications of the radiation imaging apparatus 100, the number of drive lines 105 required for the pixel array 102 may greatly deviate from the number of terminals G of the drive circuit 103, and the number of terminals G included in the terminal groups 302 that are not connected to the drive lines 105 may be large. In this case, a dead period 801 is longer than in the case shown in FIGS. 5 and 6. A detection range 802 of the voltage Vvs is larger than in the case shown in FIG. 6, too.

In this case, since the dead period 801 is long, the time from the start of radiation irradiation to detection may be long, and the responsiveness of the radiation imaging apparatus 100 may become poor. In addition, since the time during which the bias current Ivs does not flow is long, the voltage Vvs after current/voltage conversion drops in the negative direction, and the time until reaching the detection threshold after the start of radiation irradiation becomes long. As a result, since detection of the start of radiation irradiation delays, and readout of signals from the pixels 101 is performed until the start of radiation irradiation is detected, a signal according to the electric charge accumulated during this time cannot be acquired.

Furthermore, since the detection range of the voltage Vvs becomes large, the input width of the ADC arranged in the detection circuit 111 at the subsequent stage needs to be made large. The resolution of the ADC arranged in the detection circuit 111 may be a fixed value such as 8 bits. For example, if the detection range 802 is twice the detection range 602, the accuracy of the voltage input to the ADC is doubled. For example, an accuracy of every 0.1 V at which A/D conversion is performed lowers to an accuracy of every 0.2 V. For the start of radiation irradiation, a small voltage difference between a case where input of radiation is absent and a case where input of radiation exists needs to be detected. For this reason, the difference of conversion accuracy of the ADC is the difference of the capability of detecting radiation irradiation in the radiation imaging apparatus 100. If an ADC having a higher resolution is used to cope with the enlargement of the detection range 602 or 802, the cost increases.

Figure 9:
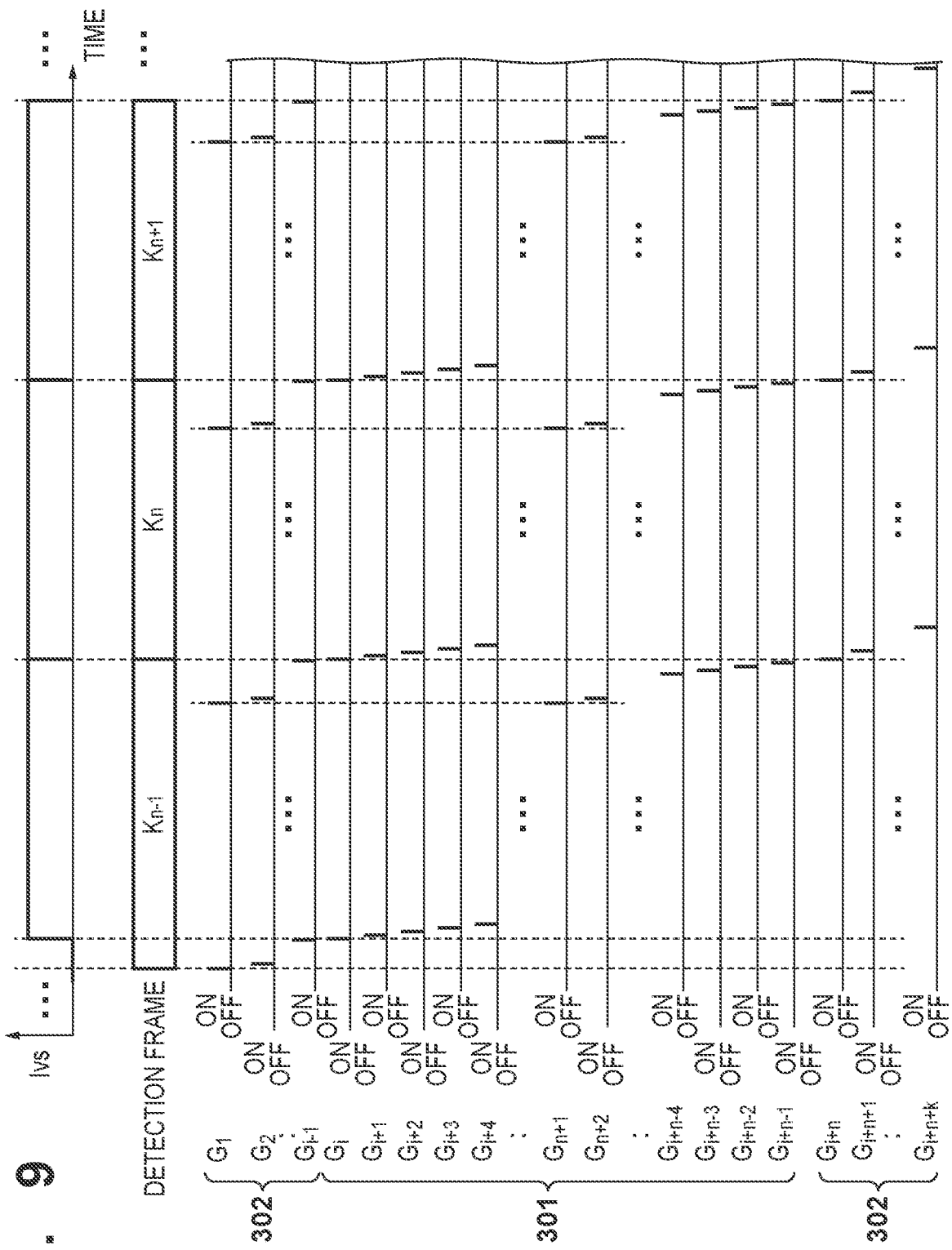
FIG. 9 is a timing chart showing an example of drive of the radiation imaging apparatus shown in FIG. 1.

Considering the problem as described above, the drive method of the radiation imaging apparatus 100 according to this embodiment will be described with reference to FIGS. 9 and 10. As described above, the drive circuit 103 configured to include a shift register performs a shift operation of sequentially outputting the activation signal from each of the plurality of terminals G one by one in accordance with a start signal supplied from the drive controller 114. That is, the drive circuit 103 sequentially outputs the activation signal from the terminals $G_1$ to $G_{1+n+k}$ in accordance with the start signal. Here, among the terminals G included in the terminal group 301 of the terminals G arranged in the drive circuit 103, the activation signal is output first from the terminal $G_i$ in the shift operation, and the activation signal is output from the terminal $G_{1+n-1}$ at last. In other words, the terminal group 301 includes the terminal $G_i$ that outputs the activation signal first in the terminal group 301 in the shift operation, and the terminal $G_{i+n-1}$ that outputs the activation signal at last.

On the other hand, in this embodiment, during the period until the detection circuit 111 detects the start of radiation irradiation, the drive controller 114 supplies a second start signal of the plurality of start signals to the drive circuit 103 before a shift operation according to a first start signal of the plurality of start signals ends. Hence, the drive circuit 103 outputs the activation signal from the terminal $G_{i+n-1}$ in the shift operation according to the first start signal and then outputs the activation signal from the terminal $G_i$ in the shift operation according to the second start signal.

In this way, during the shift operation in which each terminal G arranged in the drive circuit 103 outputs the activation signal in accordance with one start signal, the subsequent start signal is supplied from the drive controller 114, and the subsequent shift operation is started. This can eliminate the time for the terminal G included in the terminal groups 302 that are not connected to the drive lines 105 to solely output the activation signal and eliminate the dead periods 601 and 801 as shown in FIGS. 6 and 8. That is, as shown in FIGS. 9 and 10, one of the terminals G (terminals $G_i$ to $G_{i+n-1}$) of the terminal group 301 connected to the drive lines 105 outputs the activation signal at the timing when each terminal G included in the terminal groups 302 that are not connected to the drive lines 105 outputs the activation signal. Since the dead period is eliminated by this drive method, the bias current Ivs is never interrupted, as shown in FIG. 10. Also, since the drop of the voltage Vvs after current/voltage conversion by the IV conversion AMP in the detection circuit 111 hardly occurs, radiation irradiation can be detected in a minimum necessary detection range 1002.

In the configuration shown in FIG. 3, the terminal G is the ith terminal that outputs the activation signal in accordance with the shift clock after the start of the shift operation. In this case, during the period until the detection circuit 111 detects the start of radiation irradiation, the drive controller 114 supplies the second start signal to the drive circuit 103 such that the shift operation according to the second start signal is started at the timing when the (i−1)th terminal G before the terminal $G_{i+n-1}$ of the plurality of terminals G in the shift operation according to the first start signal outputs the activation signal.

A case can also be considered in which, in connection between the drive circuit 103 and the drive lines 105, the terminals $G_1$ to $G_{1-1}$ are not arranged, and the terminal $G_1$ included in the terminal group 301 connected to the drive lines 105 is the terminal that outputs the activation signal first in the shift operation. In this case, during the period until the detection circuit 111 detects the start of radiation irradiation, the drive controller 114 supplies the second start signal to the drive circuit 103 such that the shift operation according to the second start signal is started at the timing when the terminal G next to the terminal $G_{i+n-1}$ that outputs the activation signal at last in the terminals included in the terminal group 301 of the plurality of terminals G in the shift operation according to the first start signal outputs the activation signal. This can suppress the occurrence of a delay of detection of the start of radiation irradiation due to the above-described dead period.

Figure 10:
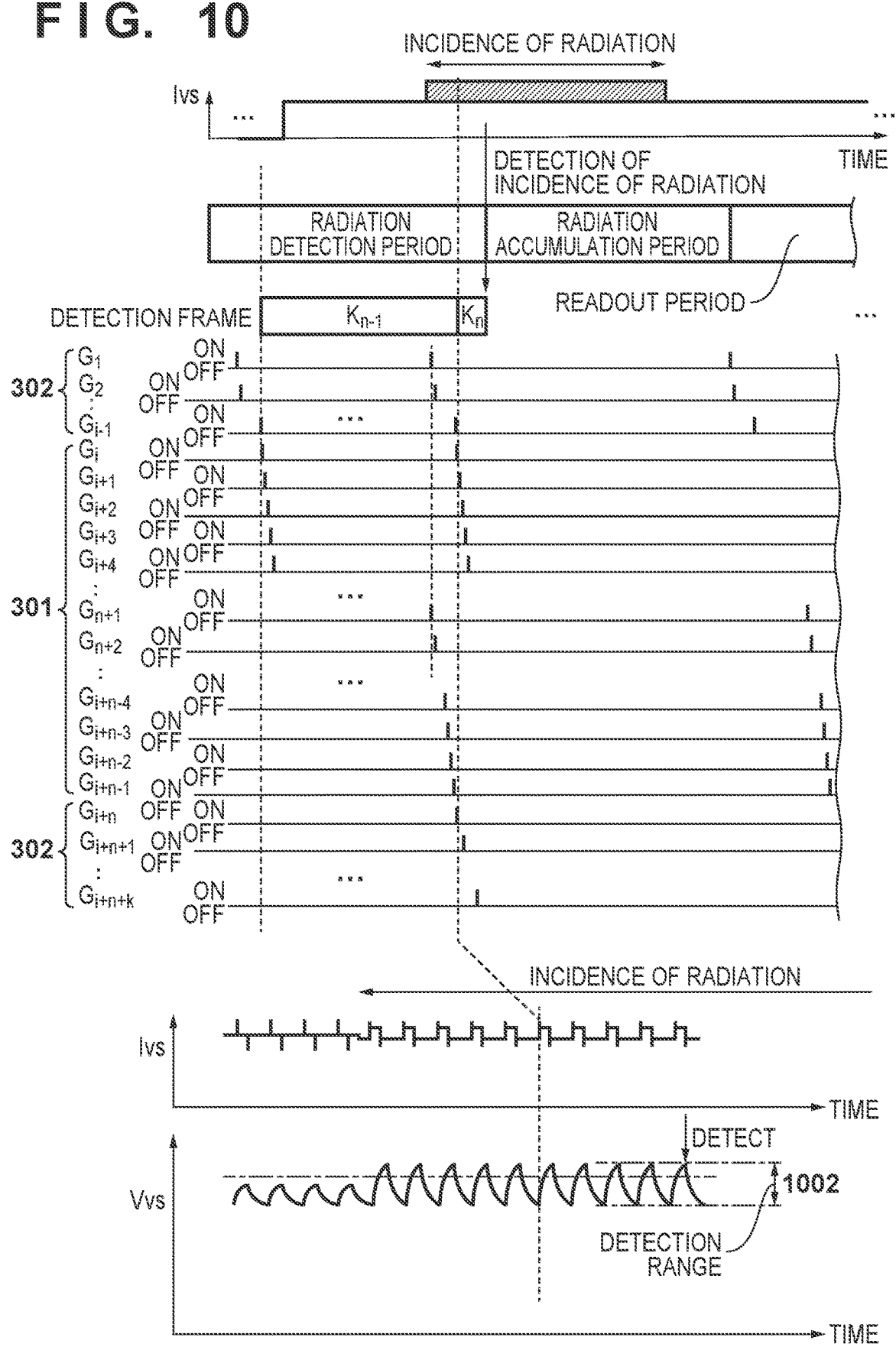
FIG. 10 is a timing chart showing an operation of detecting the start of radiation irradiation in the radiation imaging apparatus shown in FIG. 1.

As shown in FIG. 10, of the plurality of start signals, the start signal supplied to the drive circuit 103 next to the first start signal may be the second start signal. In this case, the activation signal is always supplied to one drive line 105. However, the present invention is not limited to this. For example, to improve the detection sensitivity, the activation signal may simultaneously be supplied to the plurality of drive lines 105. That is, the drive controller 114 may supply at least one start signal of the plurality of start signals to the drive circuit 103 between the above-described first start signal and the second start signal. In this case, the drive controller 114 may supply another additional start signal to the drive circuit 103 such that the terminal G that outputs the activation signal first in the terminals included in the terminal group 301 of the plurality of terminals G outputs the activation signal at the timing when the terminal G that outputs the activation signal next to the terminal G that outputs the activation signal at last in the terminals included in the terminal group 301 of the plurality of terminals G outputs the activation signal in the shift operation according to the additional start signal between the first start signal and the second start signal.

By the above-described operation, during the period in which the detection circuit 111 detects the start of radiation irradiation, the radiation imaging apparatus 100 can detect the bias current Ivs that flows to the bias line 107 as the signal always output from the pixel 101. This allows the radiation imaging apparatus 100 according to this embodiment to more reliably quickly detect the start of radiation irradiation.

Figure 11:
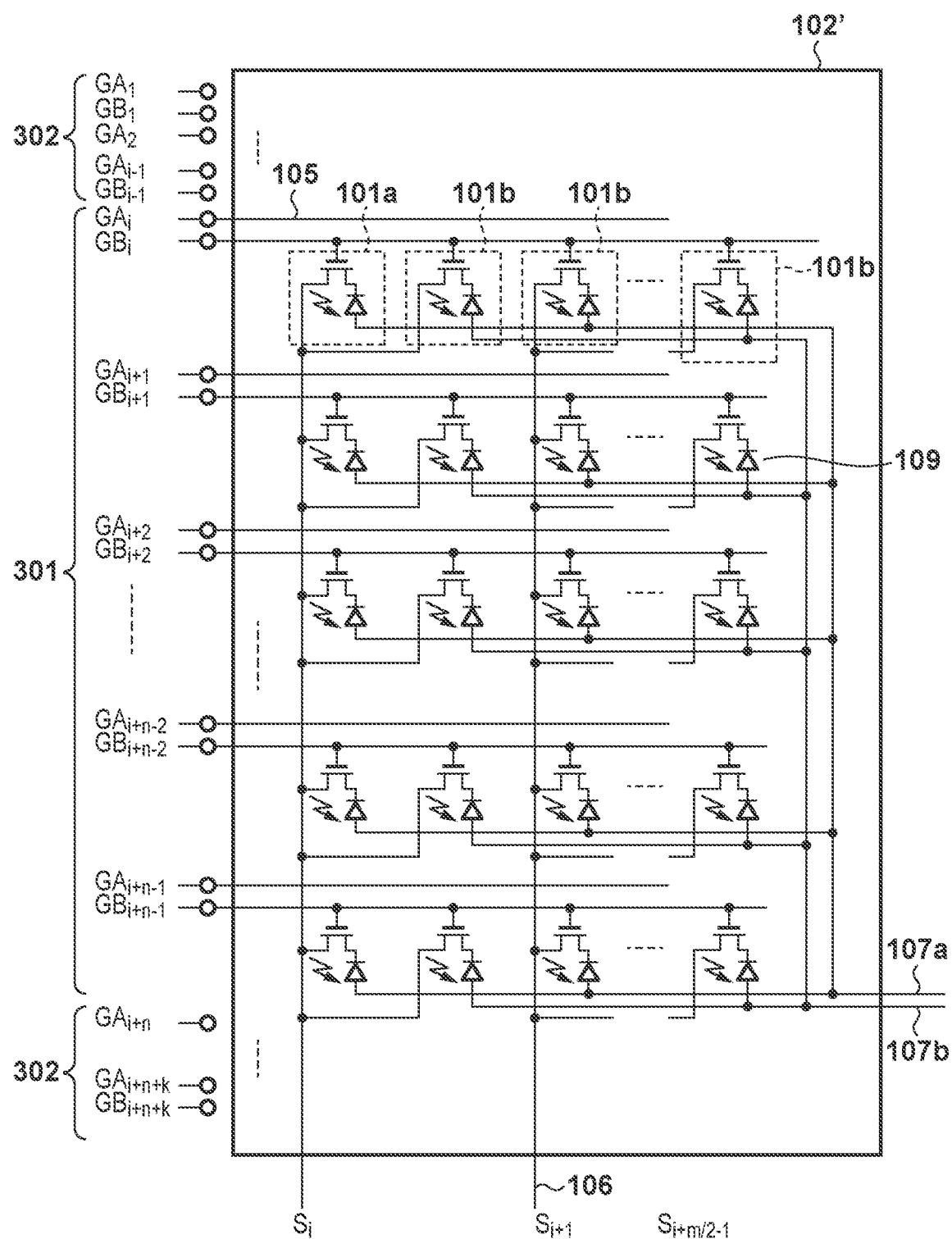
FIG. 11 is a view showing a modification of the pixel array shown in FIG. 3.
Figure 12:
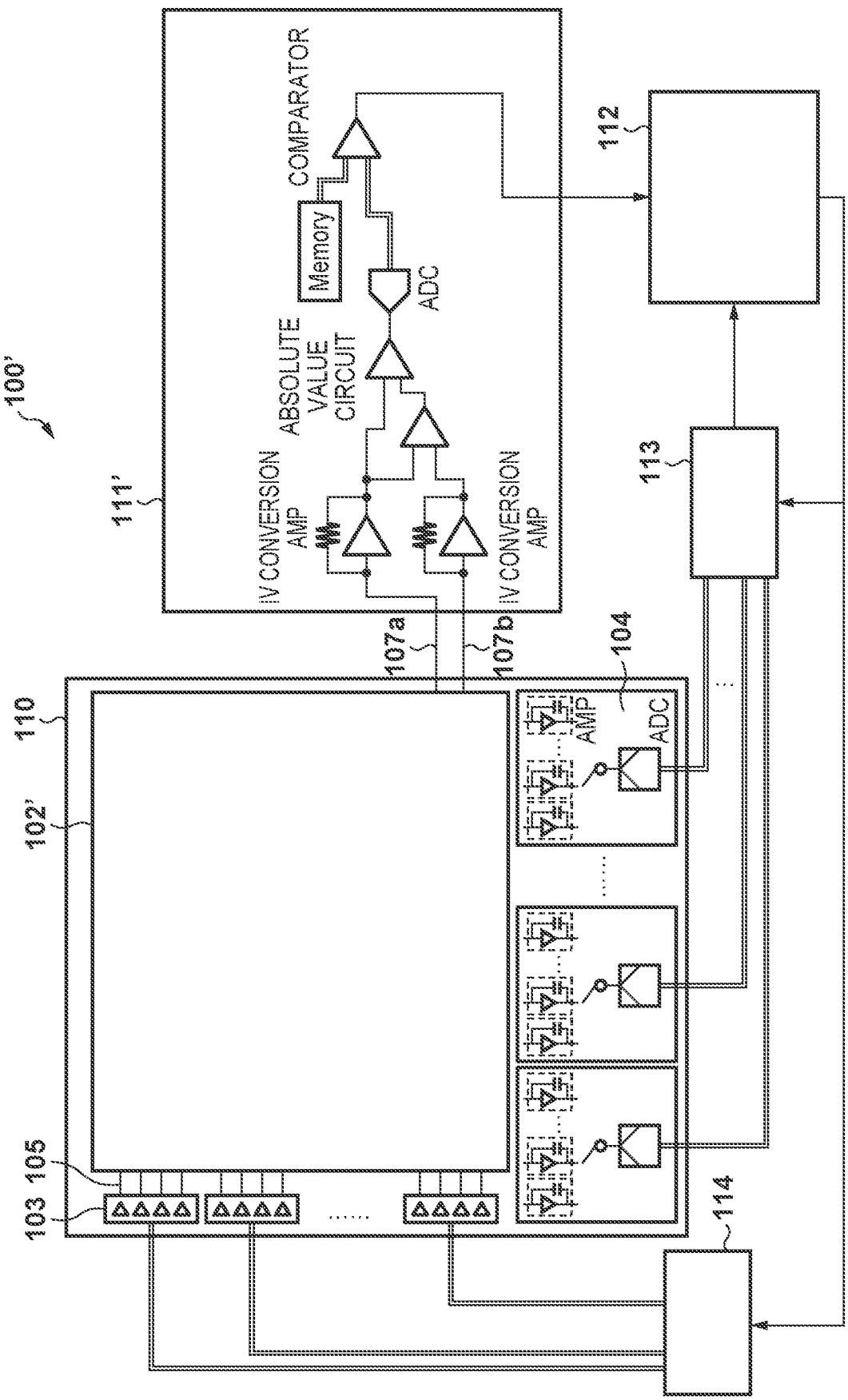
FIG. 12 is a view showing a modification of the radiation imaging apparatus shown in FIG. 1.

FIGS. 11 and 12 are views showing a modification of the above-described radiation imaging apparatus 100. FIG. 11 shows an example of the configuration of a pixel array 102' as a modification of the pixel array 102 shown in FIG. 3. FIG. 12 shows an example of the configuration of a radiation imaging apparatus 100' as a modification of the radiation imaging apparatus 100 shown in FIG. 1, in which the pixel array 102' is arranged.

As shown in FIG. 11, the plurality of pixels 101 arranged in the pixel array 102' include pixels 101a belonging to a first pixel group and pixels 101b belonging to a second pixel group, which are connected to drive lines different from each other in the plurality of drive lines 105. At this time, the above-described bias source 307 supplies the bias voltage to the conversion elements 109 of the pixels 101a belonging to the first pixel group and the conversion elements 109 of the pixels 101b belonging to the second pixel group via electrically independent bias lines 107a and 107b.

As shown in FIG. 11, the pixels 101a belonging to the first pixel group and the pixels 101b belonging to the second pixel group may alternately be arranged in the row direction in which the drive lines 105 extend. In this case, the pixels 101a belonging to the first pixel group and the pixels 101b belonging to the second pixel group, which are adjacent to each other, may share one signal line 106 of the plurality of signal lines 106. In the pixel array 102' shown in FIG. 11, if the number of pixels 101 is the same as the pixel array 102 shown in FIG. 3, the number of drive lines 105 may be a multiple of the number of pixel groups (the number of electrically independent bias lines). That is, in this embodiment, the number of drive lines 105 is doubled. Hence, in the pixel array 102', the scanning time in which scanning is performed by sequentially outputting the activation signal from the drive circuit 103 to the drive lines 105 is twice that of the pixel array 102. However, since the number of signal lines 106 is halved, and therefore, the scale of the readout circuit 104 can be halved, there is a cost advantage.

In the radiation imaging apparatus 100' shown in FIG. 12, the configuration of a detection circuit 111' is different from the detection circuit 111 shown in FIG. 1. In the configuration shown in FIG. 12, the bias line 107 changes to the two bias lines 107a and 107b. Hence, after bias currents Ivsa and Ivsb flowing to the two bias lines 107a and 107b are converted into voltages, the difference between the voltages is obtained by an absolute value circuit, and the absolute value is A/D-converted. Next, the A/D-converted absolute value is compared by a comparator with a predetermined threshold stored in a storage unit (Memory), thereby detecting radiation irradiation. That is, the detection circuit 111' acquires a first signal value representing the bias current Ivsa flowing to the bias line 107a connected to the pixels 101a of the first pixel group and a second signal value representing the bias current Ivsb flowing to the bias line 107b connected to the pixels 101b of the second pixel group such that at least parts of sampling timings overlap, and detects the start of radiation irradiation based on the first signal value and the second signal value. For example, when radiation irradiation is detected based on the difference between the first signal value and the second signal value, the influence of external noise or vibrations can be suppressed.

Figure 13:
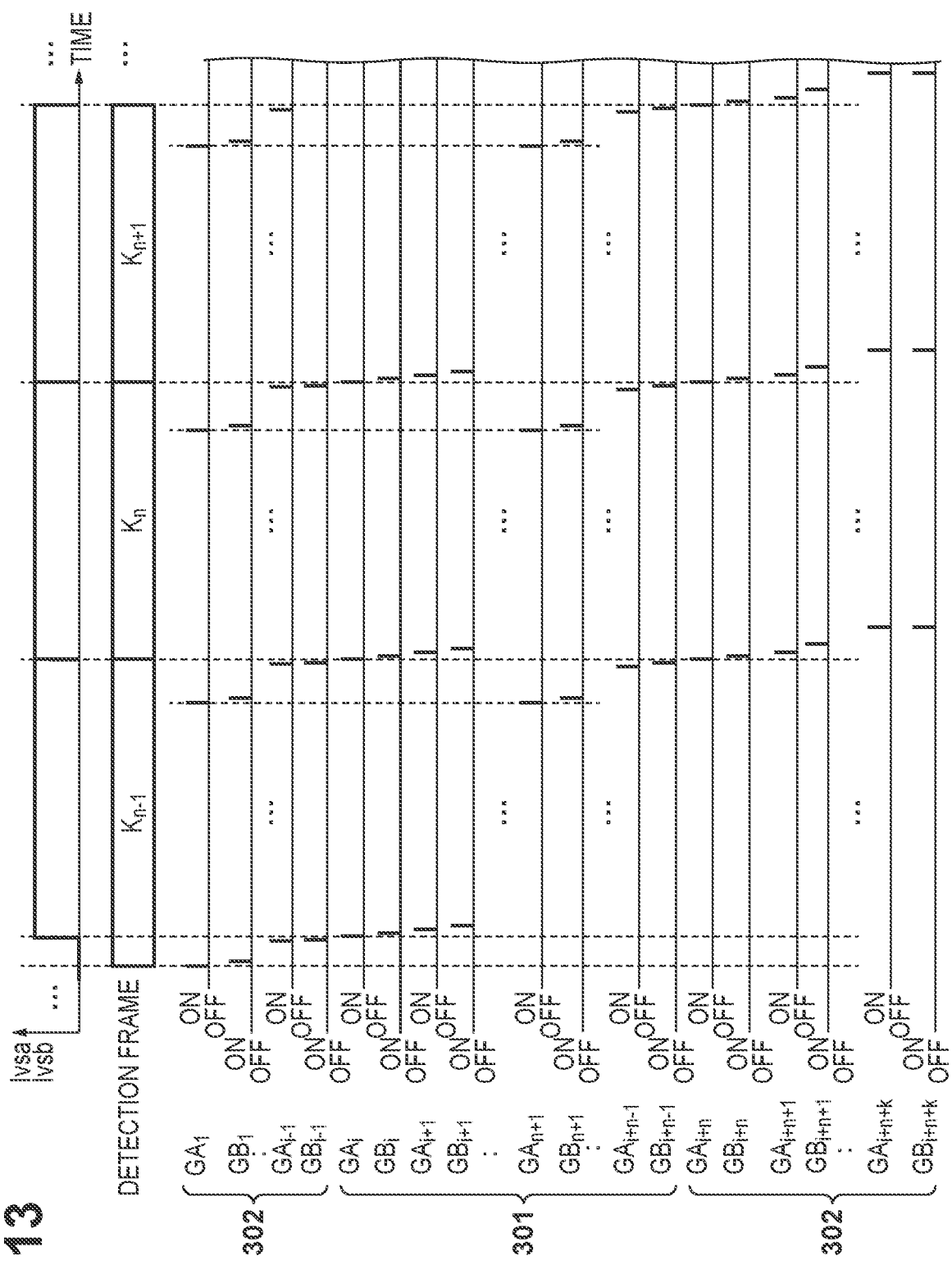
FIG. 13 is a timing chart showing an example of drive of the radiation imaging apparatus shown in FIG. 12.

The operation of the radiation imaging apparatus 100' will be described with reference to FIGS. 13 and 14. The drive circuit 103 configured to include a shift register performs a shift operation of sequentially outputting the activation signal from each of the plurality of terminals G one by one in accordance with a start signal supplied from the drive controller 114, like the operation described with reference to FIGS. 9 and 10. That is, the drive circuit 103 sequentially outputs the activation signal from terminals $GA_1$ to $GB_{i+n+k}$ in accordance with the start signal. Here, among the terminals G included in the terminal group 301 of the terminals G arranged in the drive circuit 103, the activation signal is output first from a terminal $GA_i$ in the shift operation, and the activation signal is output from a terminal $GB_{i+n-1}$ at last.

At this time, during the period until the detection circuit 111' detects the start of radiation irradiation, the drive controller 114 supplies the second start signal of the plurality of start signals to the drive circuit 103 before a shift operation according to the first start signal of the plurality of start signals ends. Hence, as in the case described with reference to FIGS. 9 and 10, the drive circuit 103 outputs the activation signal from the terminal $GB_{i+n-1}$ in the shift operation according to the first start signal and then outputs the activation signal from the terminal $GA_i$ in the shift operation according to the second start signal. In this way, during the shift operation in which each terminal G arranged in the drive circuit 103 outputs the activation signal in accordance with one start signal, the subsequent start signal is supplied from the drive controller 114, and the subsequent shift operation is started. This can eliminate the time for the terminal G included in the terminal groups 302 that are not connected to the drive lines 105 to solely output the activation signal and eliminate the dead periods 601 and 801 as shown in FIGS. 6 and 8.

Figure 14:
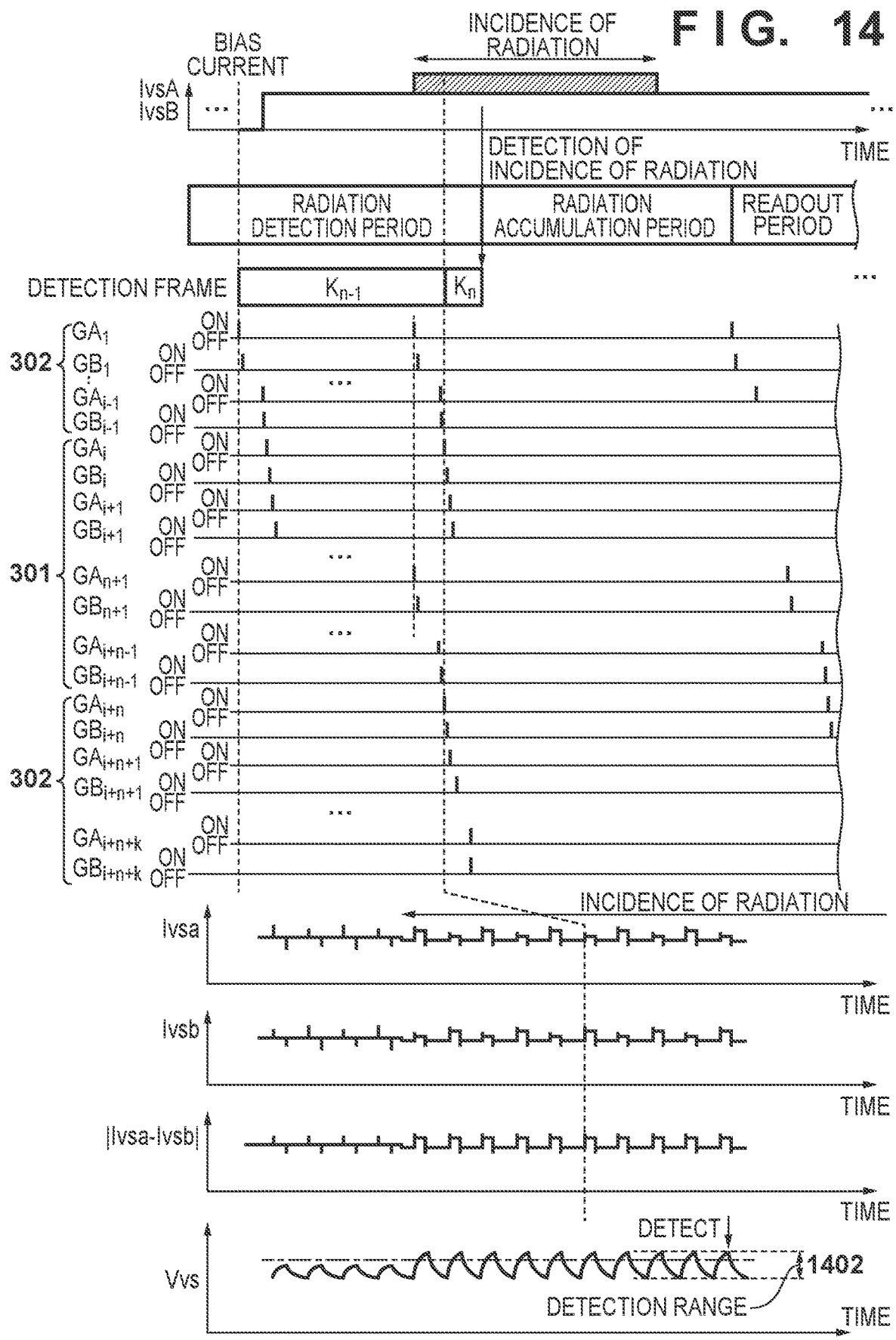
FIG. 14 is a timing chart showing an operation of detecting the start of radiation irradiation in the radiation imaging apparatus shown in FIG. 12.

FIG. 14 shows the waveforms of the bias currents Ivsa and Ivsb flowing to the bias lines 107a and 107b, respectively, and the absolute value of the difference between the bias current Ivsa and the bias current Ivsb, which is obtained by the absolute value circuit in the detection circuit 111'. FIG. 14 also shows the waveform of the voltage Vvs after current/voltage conversion, which is input to the ADC in the detection circuit 111'. The bias lines 107a and 107b are connected to the pixels 101a and 101b arranged in different pixel groups. The bias currents Ivsa and Ivsb flow to the bias lines 107a and 107b when the pixels 101a and 101b connected to the bias lines 107a and 107b for each row are turned on in accordance with the activation signal. Hence, when the activation signal is sequentially given to the drive lines 105, the bias currents Ivsa and Ivsb flow to the bias lines 107a and 107b, respectively, for each row to be driven. Also, if the switch element 108 transitions between the ON operation and the OFF operation via the drive line 105, an injection current flows to the bias line 107 due to a stray capacitance existing between the gate and the source of the switch element 108 such as a TFT and between the gate and the drain.

If two (two systems of) bias lines 107 are used, the bias lines 107a and 107b can be juxtaposed closely. For this reason, a current also flows to the other bias line 107b due to the injection current of the bias line 107a connected to the pixel 101 (here, the following description will be made assuming that the pixel is the pixel 101a), which transitions between the ON operation and the OFF operation due to the coupling capacitance between the lines. This current has a different magnitude but flows in the same direction. On the other hand, the electric charge generated by the conversion element 109 in a case of incidence of radiation flows only when the switch element 108 is turned on. Hence, if the difference between the currents is obtained, the electric charge generated by radiation can be extracted without a change, and the influence of the injection current can be reduced. Since the influence of the injection current is reduced, a detection range 1402 of the voltage Vvs can be made narrower than the detection range 1002 shown in FIG. 10. That is, the pixels 101 are divided into a plurality of pixel groups using the bias lines 107 that are electrically independent of each other, thereby making it possible to increase the resolution for detecting radiation irradiation. Also, as described above, since in-phase noise superimposed on the bias lines 107a and 107b can be suppressed by obtaining the difference between the bias current Ivsa and the bias current Ivsb, the influence of vibrations, external noise, and the like can effectively be suppressed.

By the above-described operation, during the period in which the detection circuit 111 detects the start of radiation irradiation, the radiation imaging apparatus 100 or 100' can detect the bias current Ivs that flows to the bias line 107 as the signal always output from the pixel 101. This allows the radiation imaging apparatus 100 according to this embodiment to more reliably quickly detect the start of radiation irradiation.

Figure 15:
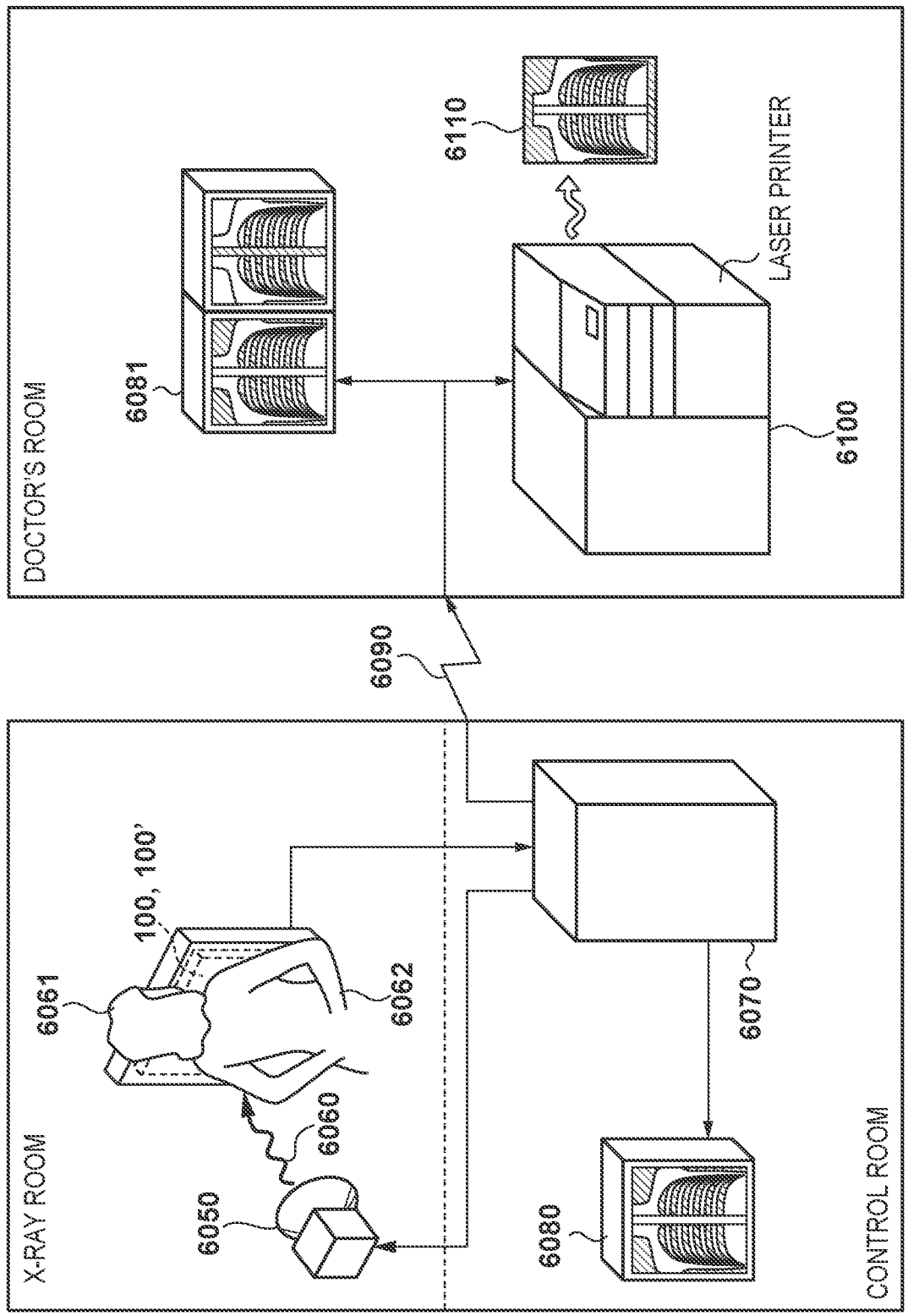
FIG. 15 is a view showing an example of the configuration of a radiation imaging system using the radiation imaging apparatus shown in FIG. 1 or 12.

A radiation imaging system incorporating the above-described radiation imaging apparatus 100 or 100' will exemplarily be described below with reference to FIG. 15. X-rays 6060 generated by an X-ray tube 6050 serving as a radiation source for emitting radiation to the radiation imaging apparatus 100 or 100' pass through a chest 6062 of a patient or object 6061 and enter the radiation imaging apparatus 100 or 100'. The incident X-rays include the internal body information of the patient or object 6061. In the radiation imaging apparatus 100 or 100', the scintillator 115 emits light in correspondence with the incidence of the X-rays 6060, and the emitted light is photoelectrically converted by photoelectric conversion elements to obtain electrical information. This information is converted into digital data, undergoes image processing by an image processor 6070 serving as a signal processing unit, and can be observed on a display 6080 serving as a display unit in a control room.

Also, this information can be transferred to a remote place by a transmission processing unit such as a telephone network 6090. This allows the information to be displayed on a display 6081 serving as a display unit in a doctor's office or the like in another place, and allows a doctor who is in a remote place to make a diagnosis. In addition, the information can be recorded on a recording medium such as an optical disk, and a film processor 6100 can also record the information on a film 6110 serving as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013578, filed Jan. 31, 2022, which is hereby incorporated by reference herein in its entirety.

What is claimed is:

1. A radiation imaging apparatus comprising: a plurality of pixels arranged to form a plurality of rows and a plurality of columns; a drive circuit configured to control the plurality of pixels via a plurality of drive lines arranged to extend in a row direction; a detection circuit configured to detect a start of radiation irradiation in accordance with signals output from the plurality of pixels; and a drive controller,
   wherein the drive circuit comprises a plurality of terminals, and is configured to perform a shift operation of sequentially outputting an activation signal from each of the plurality of terminals one by one in accordance with a shift clock in response to each of a plurality of start signals including a first start signal and a second start signal, which are supplied from the drive controller,
   the plurality of terminals include a first terminal group that is connected to the plurality of drive lines and is configured to continuously output the activation signal for activating the plurality of drive lines, and a second terminal group that is not connected to the plurality of drive lines,
   the first terminal group includes a first terminal configured to output the activation signal first in the first terminal group and a second terminal configured to output the activation signal at last in the shift operation, and
   during a period until the detection circuit detects the start of radiation irradiation,
   the drive controller is configured to supply the second start signal to the drive circuit before the shift operation according to the first start signal ends, and
   the drive circuit is configured to output the activation signal from the second terminal in the shift operation according to the first start signal and then outputs the activation signal from the first terminal in the shift operation according to the second start signal.

2. The apparatus according to claim 1, wherein a start signal supplied to the drive circuit next to the first start signal of the plurality of start signals is the second start signal.

3. The apparatus according to claim 1, wherein the drive controller is configured to supply at least one start signal of the plurality of start signals to the drive circuit between the first start signal and the second start signal.

4. The apparatus according to claim 1, wherein
   the first terminal is an ith terminal that outputs the activation signal in accordance with the shift clock after the start of the shift operation, and
   during the period until the detection circuit detects the start of radiation irradiation, the drive controller is configured to supply the second start signal to the drive circuit such that the shift operation according to the second start signal is started at a timing when an (i−1)th terminal before the second terminal of the plurality of terminals in the shift operation according to the first start signal outputs the activation signal.

5. The apparatus according to claim 1, wherein
   the first terminal outputs the activation signal first in the shift operation, and
   during the period until the detection circuit detects the start of radiation irradiation, the drive controller is configured to supply the second start signal to the drive circuit such that the shift operation according to the second start signal is started at a timing when a terminal next to the second terminal of the plurality of terminals outputs the activation signal in the shift operation according to the first start signal.

6. The apparatus according to claim 1, further comprising a bias source,
   wherein each of the plurality of pixels includes a conversion element configured to convert radiation into an electric charge,
   the bias source supplies a bias voltage to the conversion element via a bias line, and
   the detection circuit is configured to detect the start of radiation irradiation in accordance with a current that flows to the bias line as a signal output from the plurality of pixels.

7. The apparatus according to claim 6, wherein
   the plurality of pixels include pixels belonging to a first pixel group and pixels belonging to a second pixel group, which are connected to drive lines different from each other in the plurality of drive lines, and
   the bias source is configured to supply the bias voltage to the conversion elements of the pixels belonging to the first pixel group and the conversion elements of the pixels belonging to the second pixel group via electrically independent bias lines.

8. The apparatus according to claim 7, wherein
   the detection circuit is configured to
   acquire a first signal value representing a current flowing to the bias line connected to the pixels of the first pixel group and a second signal value representing a current flowing to the bias line connected to the pixels of the second pixel group such that at least parts of sampling timings overlap, and detect the start of radiation irradiation based on the first signal value and the second signal value.

9. The apparatus according to claim 7, wherein the pixels belonging to the first pixel group and the pixels belonging to the second pixel group are alternately arranged in the row direction.

10. The apparatus according to claim 9, further comprising a plurality of signal lines arranged to extend in a column direction to read out a signal generated by each of the plurality of pixels, wherein the pixels belonging to the first pixel group and the pixels belonging to the second pixel group, which are adjacent to each other, share one signal line of the plurality of signal lines.

11. The apparatus according to claim 1, wherein a terminal of the first terminal group outputs the activation signal at a timing when each terminal included in the second terminal group outputs the activation signal.

12. A radiation imaging system comprising:
the radiation imaging apparatus according to claim 1; and
a signal processing unit configured to process a signal output from the radiation imaging apparatus.

* * * * *